United States Patent
Guo (10) Patent No.: US 11,200,714 B2
(45) Date of Patent: Dec. 14, 2021

(54) VIRTUAL IMAGE DISTANCE MEASUREMENT METHOD, APPARATUS AND DEVICE

(71) Applicant: YUTOU TECHNOLOGY (HANGZHOU) CO., LTD., Hangzhou (CN)

(72) Inventor: Kaikai Guo, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/855,183

(22) Filed: Apr. 22, 2020

(65) Prior Publication Data

US 2020/0342642 A1    Oct. 29, 2020

(30) Foreign Application Priority Data

Apr. 23, 2019    (CN) .......................... 201910329844.3

(51) Int. Cl.
| | |
|---|---|
| *G06T 11/20* | (2006.01) |
| *G06T 7/262* | (2017.01) |
| *G01B 11/14* | (2006.01) |
| *G06T 11/60* | (2006.01) |

(52) U.S. Cl.
CPC ............ *G06T 11/203* (2013.01); *G01B 11/14* (2013.01); *G06T 7/262* (2017.01); *G06T 11/60* (2013.01)

(58) Field of Classification Search
CPC ..... G01B 11/026; G01B 11/14; G06T 11/203; G06T 11/60; G06T 7/262
See application file for complete search history.

(56) References Cited

U.S. PATENT DOCUMENTS

| | | | | |
|---|---|---|---|---|
| 6,409,345 | B1 * | 6/2002 | Molebny | A61B 3/1015 351/212 |
| 2006/0187337 | A1 * | 8/2006 | Ichikawa | H04N 5/217 348/370 |
| 2011/0267583 | A1 * | 11/2011 | Hayashi | G01B 9/02044 351/206 |
| 2012/0133951 | A1 * | 5/2012 | Heinisch | G01B 11/14 356/498 |
| 2012/0209429 | A1 * | 8/2012 | Yamaguchi | B25J 9/1697 700/259 |
| 2014/0347501 | A1 * | 11/2014 | Ishida | H04N 5/23235 348/207.1 |
| 2015/0292871 | A1 * | 10/2015 | Kaneko | G01B 11/22 348/135 |
| 2016/0325393 | A1 * | 11/2016 | Daimaru | B24B 13/005 |

* cited by examiner

*Primary Examiner* — Ming Wu (74) *Attorney, Agent, or Firm* — Getech Law LLC; Jun Ye (57) ABSTRACT

The present invention relates to a virtual image distance measurement method, apparatus and device. The method includes: disposing a light blocking element, a lens element and an imaging element along the optical axis of the lens element in sequence, wherein a light transmitting portion is formed on the light blocking element, and the virtual image position of a measured near-eye display does not coincide with the imaging position of the lens element; presenting, by a virtual image of the measured near-eye display, multiple images on the imaging element after passing through the light blocking element and the lens element; and determining a distance measurement parameter based on the multiple images, and substituting the distance measurement parameter into a preset distance calculation formula to obtain a virtual image distance.

16 Claims, 7 Drawing Sheets

VIRTUAL IMAGE DISTANCE MEASUREMENT METHOD, APPARATUS AND DEVICE

FIELD OF THE INVENTION

The present invention relates to the technical field of virtual image distance measurement, and in particular to a virtual image distance measurement method, apparatus and device.

BACKGROUND OF THE INVENTION

The measurement of virtual image distances in near-eye display systems such as virtual reality display (Virtual Reality Display) and augmented reality display (Augmented Reality Display) is still a key challenge. A calibrated camera lens is employed in the existing virtual image distance measurement technology, the imaging distance is changed at fixed intervals along the optical axis W of the lens, and an image is taken at each imaging distance. These images are analyzed, and the imaging distance corresponding to the clearest image is the virtual image distance of the measured near-eye display system. Or, a camera lens is employed, and the imaging distance of the camera is adjusted so that the image of the virtual image of the near-eye display system is the clearest. In the case of this imaging distance, an actual object is adopted, and the distance between the actual object and the camera lens is adjusted so that the image of the virtual image of the near-eye display system is the clearest, and at this time, the distance between the actual object and the camera lens is equal to the virtual image distance of the measured near-eye display system.

However, the existing virtual image distance measurement technology has the following disadvantages: 1) a measurement instrument requires a precise mechanical moving device to change the imaging distance of the camera lens, which requires high accuracy of a mechanical scanning device; 2) due to frequent mechanical scanning during the measurement, it is necessary to periodically correct the mechanical scanning components of the measurement instrument; and 3) multiple pictures need to be collected along the optical axis W or the camera lens needs to be moved during the measurement, so this measurement process takes a long time.

SUMMARY OF THE INVENTION

The purpose of the present invention is to provide a virtual image distance measurement method, apparatus and device. The requirements for the accuracy of mechanical scanning devices are low, no mechanical scanning is required during the measurement process, and only a picture needs to be collected to obtain a virtual image distance, so that the measurement time is short, and the measurement accuracy is high.

In order to solve the above technical problems, according to a first embodiment of the present invention, a virtual image distance measurement method is provided, including:

disposing a light blocking element, a lens element and an imaging element along the optical axis of the lens element in sequence, wherein a light transmitting portion is formed on the light blocking element, and the virtual image position of a measured near-eye display does not coincide with the imaging position of the lens element;

presenting, by a virtual image of the measured near-eye display, multiple images on the imaging element after passing through the light blocking element and the lens element; and determining a distance measurement parameter based on the multiple images, and substituting the distance measurement parameter into a preset distance calculation formula to obtain a virtual image distance.

Further, the light transmitting portion includes M light transmitting holes, and the virtual image of the measured near-eye display presents M images on the imaging element after passing through the light blocking element and the lens element, wherein M is a positive integer greater than or equal to 2; and the distance measurement parameter is the relative movement amount of the M images, and is set as S, the virtual image distance is set as D2, and the preset distance calculation formula is $D2=1/(a*S+b)$, wherein a and b are coefficients.

Further, the method further includes: determining the values of a and b, which specifically includes:

disposing a first reference object, wherein the first reference object is configured to simulate the virtual image of the measured near-eye display, and the distance between the first reference object and the lens element is set as D;

moving the first reference object along the optical axis of the lens element, obtaining a D value by the measurement of a distance measurement apparatus, obtaining multiple D values, causing the first reference object to correspond to a group of M images on the imaging element corresponding to each D value, and calculating the relative movement amount S of each group of M images to obtain multiple groups of D values and S values; and determining the a value and the b value based on the multiple groups of D values and S values.

Further, the light transmitting portion includes two light transmitting holes, the first reference object presents two images on the imaging element, and the calculating the relative movement amount S of the two images on the imaging element includes:

collecting an image presented by the first reference object on the imaging element, and setting the same as a first image;

performing first time two-dimensional Fourier transform on the first image, and taking an absolute value of a Fourier transform result to obtain a second image;

performing second time two-dimensional Fourier transform on the second image, and taking the absolute value of the Fourier transform result to obtain a third image;

taking the values of a column of pixels at the middle of the third image along the connecting line direction of the two light transmitting holes;

drawing a first curve by using the values of the column of pixels as vertical coordinates and the values of the corresponding pixel positions as abscissas; and obtaining a middle peak position m of the first curve and a peak position n on the left side or right side of the middle peak, and obtaining the absolute value of m-n, that is, the relative movement amount S of the two images presented by the first reference object on the imaging element.

Further, it is set that the center distance between the two light transmitting holes is SP, the diameter of each light transmitting hole is DP, the entrance pupil diameter of the lens element is d, and SP+DP is less than d.

Further, the light transmitting portion is a light passing circular ring, the center of the light passing circular ring coincides with the center of the optical axis of the lens element, the virtual image of the measured near-eye display presents a plurality of circular rings on the imaging element after passing through the light blocking element and the lens element, the distance measurement parameter is the diameter of the circular ring and is set as DC, the virtual image distance is set as D2, and the preset distance calculation formula is D2=1/(c*DC+d), wherein c and d are coefficients.

Further, the method further includes: determining the values of c and d, which specifically includes:

disposing a second reference object, wherein the second reference object includes a plurality of separated bright spots for simulating the virtual image of the measured near-eye display, setting the distance between the second reference object and the lens element as D0, and obtaining a D0 value by the measurement of the distance measurement apparatus;

moving the second reference object along the optical axis of the lens element, obtaining multiple D0 values, causing the second reference object to correspond to a plurality of circular rings in one group on the imaging element corresponding to each D0 value, and obtaining the diameters DC of the circular rings through Hough transform to obtain multiple groups of D0 values and DC values; and determining the values of c and d based on the multiple groups of D0 values and DC values.

Further, the outer diameter of the light passing circular ring is less than the entrance pupil diameter of the lens element.

According to a second embodiment of the present invention, a virtual image distance measurement apparatus is provided, including:

a calculation module, and a light blocking element, a lens element and an imaging element, which are sequentially disposed along the optical axis of the lens element, wherein a light transmitting portion is formed on the light blocking element, and the virtual image position of a measured near-eye display does not coincide with the imaging position of the lens element; a virtual image of the measured near-eye display presents multiple images on the imaging element after passing through the light blocking element and the lens element; and the calculation module is configured to determine a distance measurement parameter based on the multiple images, and substitute the distance measurement parameter into a preset distance calculation formula to obtain a virtual image distance.

Further, the light transmitting portion includes M light transmitting holes, and the virtual image of the measured near-eye display presents M images on the imaging element after passing through the light blocking element and the lens element, wherein M is a positive integer greater than or equal to 2; and the distance measurement parameter is the relative movement amount of the M images, and is set as S, the virtual image distance is set as D2, and the preset distance calculation formula is D2=1/(a*S+b), wherein a and b are coefficients.

Further, the calculation module is further configured to determine the values of a and b, which specifically includes:

disposing a first reference object, wherein the first reference object is configured to simulate the virtual image of the measured near-eye display, and the distance between the first reference object and the lens element is set as D;

moving the first reference object along the optical axis of the lens element, obtaining a D value by the measurement of a distance measurement apparatus, obtaining multiple D values, causing the first reference object to correspond to a group of M images on the imaging element corresponding to each D value, and calculating the relative movement amount S of each group of M images to obtain multiple groups of D values and S values; and determining the a value and the b value based on the multiple groups of D values and S values.

Further, the light transmitting portion includes two light transmitting holes, the first reference object presents two images on the imaging element, and the calculation module is further configured to calculate the relative movement amount S of the two images on the imaging element, which specifically includes:

a first image obtaining unit, configured to collect an image presented by the first reference object on the imaging element, and set the same as a first image;

a second image obtaining unit, configured to perform first time two-dimensional Fourier transform on the first image, and take an absolute value of a Fourier transform result to obtain a second image;

a third image obtaining unit, configured to perform second time two-dimensional Fourier transform on the second image, and take the absolute value of the Fourier transform result to obtain a third image;

a pixel value obtaining unit, configured to take the values of a column of pixels at the middle of the third image along the connecting line direction of the two light transmitting holes;

a first curve drawing unit, configured to draw a first curve by using the values of the column of pixels as vertical coordinates and the values of the corresponding pixel positions as abscissas; and a relative movement amount obtaining unit, configured to obtain a middle peak position m of the first curve and a peak position n on the left side or right side of the middle peak, and obtain the absolute value of m-n, that is, the relative movement amount S of the two images presented by the first reference object on the imaging element.

Further, it is set that the center distance between the two light transmitting holes is SP, the diameter of each light transmitting hole is DP, the entrance pupil diameter of the lens element is d, and SP+DP is less than d.

Further, the light transmitting portion is a light passing circular ring, the center of the light passing circular ring coincides with the center of the optical axis of the lens element, the virtual image of the measured near-eye display presents a plurality of circular rings on the imaging element after passing through the light blocking element and the lens element, the distance measurement parameter is the diameter of the circular ring and is set as DC, the virtual image distance is set as D2, and the preset distance calculation formula is D2=1/(c*DC+d), wherein c and d are coefficients.

Further, the calculation module is further configured to determine the values of c and d, which specifically includes:

disposing a second reference object, wherein the second reference object includes a plurality of separated bright spots for simulating the virtual image of the measured near-eye display, setting the distance between the second reference object and the lens element as D0, and obtaining a D0 value by the measurement of the distance measurement apparatus;

moving the second reference object along the optical axis of the lens element, obtaining multiple D0 values, causing the second reference object to correspond to a plurality of circular rings in one group on the imaging element corresponding to each D0 value, and obtaining the diameters DC of the circular rings through Hough transform to obtain multiple groups of D0 values and DC values; and determining the values of c and d based on the multiple groups of D0 values and DC values.

Further, the outer diameter of the light passing circular ring is less than the entrance pupil diameter of the lens element.

According to a third embodiment of the present invention, a virtual image distance measurement device is provided, including a light blocking element, a lens element and an imaging element, which are sequentially disposed along the optical axis of the lens element, wherein a light transmitting portion is formed on the light blocking element, so that a virtual image of a measured near-eye display presents multiple images on the imaging element after passing through the light blocking element and the lens element, and the virtual image position of the measured near-eye display does not coincide with the imaging position of the lens element.

Further, the light transmitting portion includes M light transmitting holes, the virtual image of the measured near-eye display presents M images on the imaging element after passing through the light blocking element and the lens element, wherein M is a positive integer greater than or equal to 2;

or, the light transmitting portion is a light passing circular ring, the center of the light passing circular ring coincides with the center of the optical axis of the lens element, and the virtual image of the measured near-eye display presents a plurality of circular rings on the imaging element after passing through the light blocking element and the lens element.

According to yet another aspect of the present invention, a controller is provided, including a memory and a processor, wherein the memory stores a computer program, and the program can implement computer-executable steps in the method when executed by the processor.

According to yet another aspect of the present invention, a computer-readable storage medium is provided for storing a computer program, wherein the program can implement computer-executable steps in the method when executed by a computer or a processor.

Compared with the prior art, the present invention has obvious advantages and beneficial effects. By means of the above technical solutions, the virtual image distance measurement method, apparatus and device, the controller and the medium provided by the present invention can achieve considerable technical progress and practicability, and have extensive industrial use values, and the present invention has at least the following advantages:

the present invention has low requirements for the accuracy of the mechanical scanning devices, no mechanical scanning is required during the measurement process, and only a picture needs to be collected to obtain the virtual image distance, so that the measurement time is short, and the measurement accuracy is high.

The above description is only an overview of the technical solutions of the present invention. In order to understand the technical means of the present invention more clearly, the present invention can be implemented in accordance with the contents of the description, and in order to make the above and other objects, features and advantages of the present invention more comprehensible, following specific preferred embodiments are listed, and detailed description is given below in combination with the drawings.

REFERENCE SIGNS

1: light blocking element
2: lens element
3: imaging element
4: measured near-eye display
5: first reference object
6: distance measurement apparatus
11: light transmitting portion
111: light transmitting hole
112: light passing circular ring
W: optical axis of the lens element A: imaging position of the lens element
B: virtual image position of a measured near-eye display

DETAILED DESCRIPTION OF THE EMBODIMENTS

In order to further explain the technical means and effects adopted by the present invention to achieve the predetermined purpose of the present invention, embodiments and effects of a virtual image distance measurement method, apparatus and device, a controller and a medium proposed according to the present invention are described below in detail with reference to the drawings and preferred embodiments.

Figure 1:
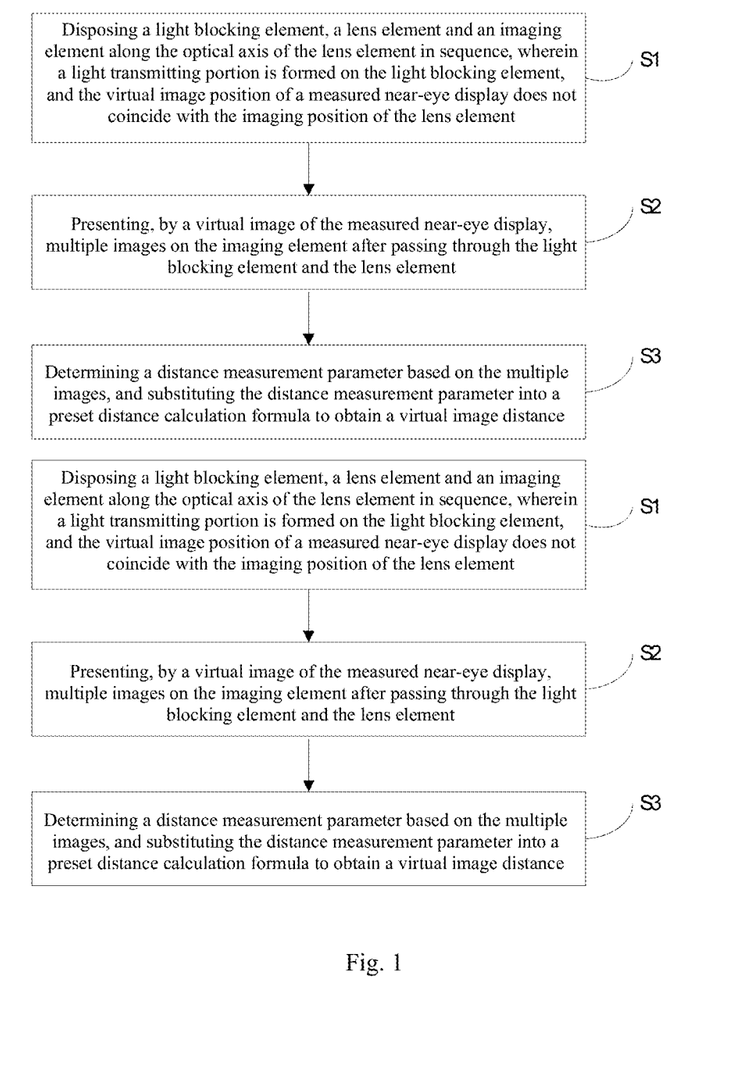
FIG. 1 is a flow diagram of a virtual image distance measurement method provided by an embodiment of the present invention.

An embodiment of the present invention provides a virtual image distance measurement method. As shown in FIG. 1, the method includes the following steps:

step S1, a light blocking element 1, a lens element 2 and an imaging element 3 are disposed along the optical axis of the lens element 2 in sequence, a light transmitting portion 11 is formed on the light blocking element 1, and the virtual image position B of a measured near-eye display 4 does not coincide with the imaging position A of the lens element 2.

Step S2, a virtual image of the measured near-eye display 4 presents multiple images on the imaging element 3 after passing through the light blocking element 1 and the lens element 2.

Step S3, a distance measurement parameter is determined based on the multiple images, and the distance measurement parameter is substituted into a preset distance calculation formula to obtain a virtual image distance.

By disposing the light transmitting portion 11 on the light blocking element 1, the movement amount of the virtual image along the direction of the optical axis W is converted into the movement amount or deformation of a measurable image on the imaging element 3: for example, a light blocking element 1 with a plurality of light passing minipores is placed on an entrance pupil or exit pupil plane of the lens element 2, and then, the variation of the virtual image along the optical axis W is converted into the relative movement amount between the images on the imaging element 3. Or, the light blocking element 1 is a light blocking plate with a light passing circular ring 112, and is placed on the entrance pupil plane of the lens element 2 so as to convert the variation of the virtual image along the optical axis W into the deformation amount of the image on the imaging element 3. Different light transmitting portions 11 are disposed to correspond to different preset distance calculation formulas, which are described below through two embodiments:

Embodiment 1

The light transmitting portion 11 includes M light transmitting holes 111, the virtual image of the measured near-eye display 4 presents M images on the imaging element 3 after passing through the light blocking element 1 and the lens element 2, wherein M is a positive integer greater than or equal to 2. The distance measurement parameter is the relative movement amount of the M images, and is set as S, the virtual image distance is set as D2, and the preset distance calculation formula is $D2=1/(a*S+b)$, wherein a and b are coefficients.

Figure 2:
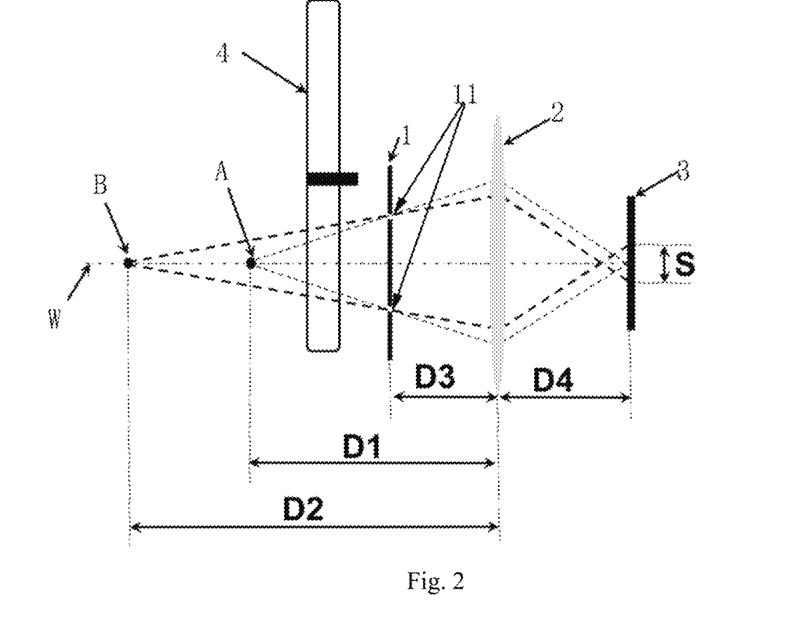
FIG. 2 is a schematic diagram of measurement of a virtual image distance provided by an embodiment of the present invention.

As an example, two light transmitting holes 111 are formed in the light blocking element 1, as shown in FIG. 2, the light blocking element 1 can be a light blocking plate provided with the light transmitting portion 11, the light blocking element 1 is placed on the entrance pupil plane of the lens element 2, the lens element 2 can be a camera lens, and the imaging distance of the lens element 2 is set as D1; the distance between the virtual image position B of the measured near-eye display 4 and the lens element 2 is the virtual image distance, which is set as D2; the distance between the light blocking element 1 and the lens element 2 is set as D3; the distance between the lens element 2 and the imaging element 3 is set as D4; when the virtual image position B of the measured near-eye display 4 does not coincide with the imaging position A of the lens element 2, the virtual image of the measured near-eye display 4 presents two images on the imaging element 3, and the relative movement amount of the two images is S.

Figure 3:
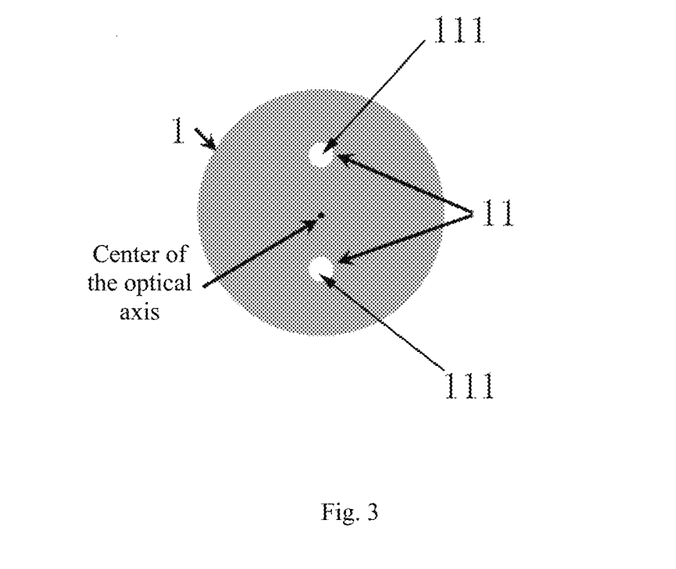
FIG. 3 is a schematic diagram of a light blocking element provided by an embodiment of the present invention.

In the example as shown in FIG. 2, the two light transmitting holes 111 are arranged along the vertical direction, as shown in FIG. 3, but it can be understood that, the light blocking element 1 shown in FIG. 2 and FIG. 3 is only an example, the number of the light transmitting holes 111 is not limited to two, and may be two or more, the arrangement manner is not limited to the arrangement along the vertical direction, and may be any direction. In FIG. 2, the distance between the centers of the two light transmitting holes 111 is set as SP, and the diameter of each light transmitting hole 111 is set as DP. For the size of each light transmitting hole 111, when the diameter of the light transmitting hole 111 becomes larger, the intensity of the image formed by each light transmitting hole 111 becomes larger, and the influence of noise in the image becomes smaller; when the diameter of the light transmitting hole 111 becomes smaller, the depth of field of an imaging system corresponding to each light transmitting hole 111 becomes larger, that is, when the position of the virtual image of the measured near-eye display 4 changes within a larger range, the virtual image of the measured near-eye display 4 can still obtain two clear images on the imaging element 3. Therefore, in specific use, a proper diameter of the light transmitting hole 111 can be selected according to the sensitivity of the imaging element 3 and the distance distribution interval of the virtual image of the measured near-eye display. For the distance between the two light transmitting holes 111, it is necessary to ensure that the SP+DP is less than the diameter d of the entrance pupil of the lens element 2, that is, both light transmitting holes 111 are within the entrance pupil of the lens element 2. On the premise of ensuring that SP+DP is less than the diameter of the entrance pupil of the lens element 2, the value of SP is in direct proportion to the value of S, therefore, it is possible to use a large value of SP, that is, the distance between the two light transmitting holes 111 should be as large as possible, in this way, in a picture collected by the imaging element 3, the relative movement amount between the two images of the virtual image of the measured near-eye display 4 is larger, so that the measurement accuracy of the virtual image distance of the near-eye display can be improved.

As an example, the focal length of the lens element 2 is f, D3 is set to be equal to f, and then the light blocking element 1 is located on a front focal plane of the lens element 2. By adjusting the distance D4 between the imaging element 3 and the lens element 2, the distance D1 between the imaging position A of the lens element 2 and the lens element 2 can be adjusted, the two distances satisfy a relational expression $D1=1(1/f-1/D4)$, so as to ensure that the virtual image position B of the measured near-eye display 4 does not coincide with the imaging position A of the lens element 2, this is because if a virtual image generated by the near-eye display is located exactly on the imaging position of the camera lens, then the image of only one clear virtual image can be observed on the imaging element 3. If the distance D2 between the virtual image of the near-eye display and the lens element 2 is not equal to D1, two images of the virtual image are observed on the imaging element 3 after passing through the light blocking element 1 with two light passing minipores and a photographing element, so that the value of S can be obtained. As an example, the distribution interval of the virtual image position of the measured near-eye display can be obtained in advance, and then the imaging position A of the lens element 2 is set at the outside of the distribution interval of the virtual image position, in order to ensure that the virtual image position of the measured near-eye display is different from the imaging position A of the lens element 2. For example, it can be known through optical design and theoretical calculation that if the distance between the virtual image of the measured near-eye display 4 and the lens element 2 is within the range of 0.2 m to 2 m, then distance between the imaging position of the lens element 2 and the camera lens can be set to be less than 0.2 m or greater than 2 m, in this way, it can be ensured that the virtual image of the near-eye display generates two images with a relative movement amount on the imaging element 3, and the distance between the virtual image and the camera lens can be calculated by using this relative movement amount.

The method further includes a step S4 of determining the values of a and b, and the process is implemented in a correction link and specifically includes:

step S41, disposing a first reference object 5, wherein the first reference object 5 is configured to simulate the virtual image of the measured near-eye display 4, and the distance between the first reference object 5 and the lens element 2 is set as D;

step S42, moving the first reference object 5 along the optical axis W of the lens element 2, obtaining a D value by the measurement of a distance measurement apparatus 6, obtaining multiple D values, causing the first reference object 5 to correspond to a group of M images on the imaging element 3 corresponding to each D value, and calculating the relative movement amount S of each group of M images to obtain multiple groups of D values and S values; and step S43, determining the a value and the b value based on the multiple groups of D values and S values.

Figure 4:
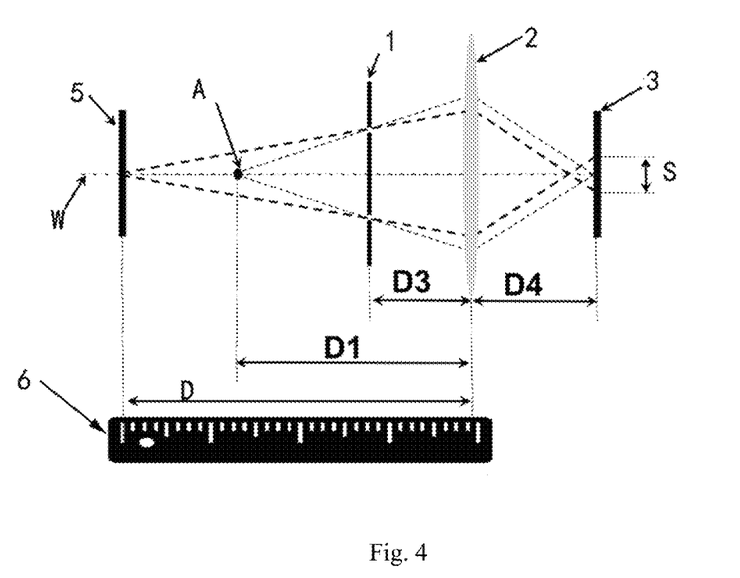
FIG. 4 is a schematic diagram of obtaining parameters in a virtual image measurement correction phase provided by an embodiment of the present invention.
Figure 5:
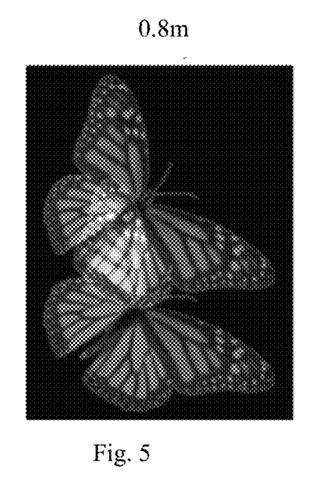
FIG. 5 is an image of a first reference object on an imaging element provided by an embodiment of the present invention, when the distance between the first reference object and a lens element is 0.8 m.
Figure 5A:
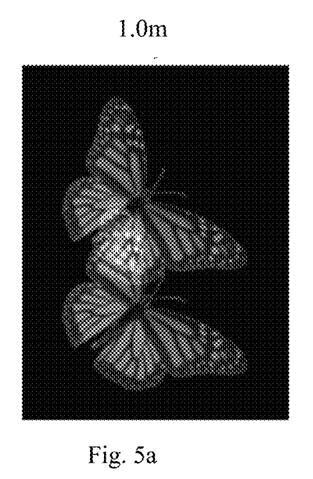
FIG. 5a is an image of the first reference object on the imaging element provided by an embodiment of the present invention, when the distance between the first reference object and the lens element is 1.0 m.
Figure 5B:
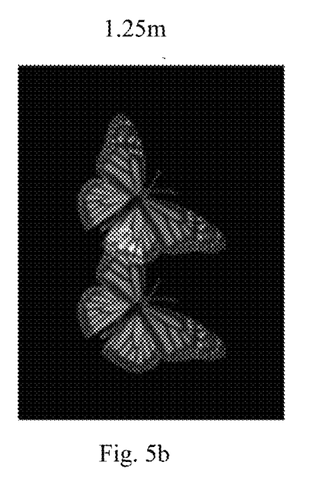
FIG. 5b is an image of the first reference object on the imaging element provided by an embodiment of the present invention, when the distance between the first reference object and the lens element is 1.25 m.

In the example as shown in FIG. 4, in the step S41 to the step S43, an actual object with a planar pattern can be used as the first reference object 5, the first reference object 5 is placed on a slidable guide rail, and the planar pattern of the first reference object 5 is the same as the height of the lens element 2. When the first reference object 5 moves to a certain position along the optical axis W of the lens element 2, the distance D between the first reference object 5 and the lens element 2 at this time is measured by using the distance measurement apparatus, and two images generated by the actual object are recorded by the imaging element 3. As an example, the distance measurement apparatus can be a ruler, a laser rangefinder, or the like. FIG. 5, FIG. 5*a* and FIG. 5*b* show the images of the first reference object taken when the distance between the first reference object 5 and the lens element 2 is respectively 0.8 m, 1.0 m and 1.25 m.

Figure 6:
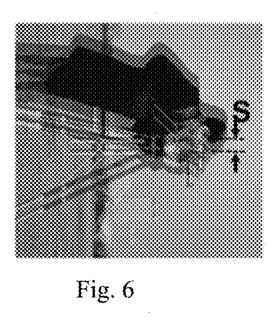
FIG. 6 is a schematic diagram of obtaining a first image provided by an embodiment of the present invention.
Figure 6A:
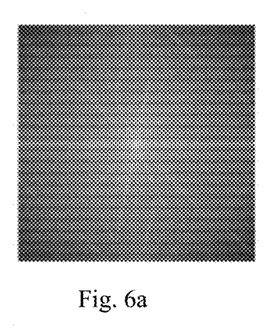
FIG. 6a is a schematic diagram of obtaining a second image provided by an embodiment of the present invention.
Figure 6B:
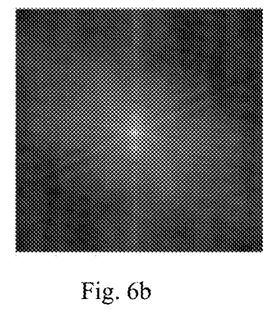
FIG. 6b is a schematic diagram of obtaining a third image provided by an embodiment of the present invention.
Figure 10:
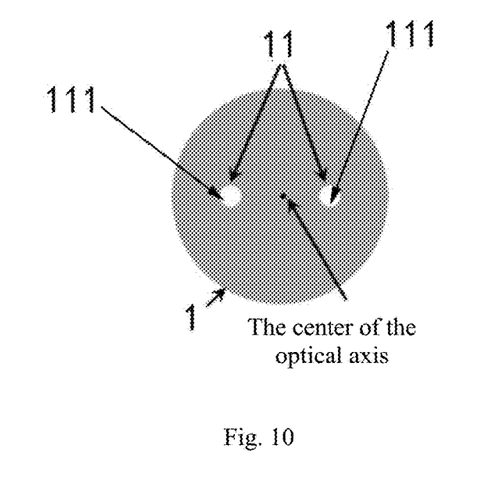
FIG. 10 is a schematic diagram of a light blocking element provided by another embodiment of the present invention.
Figure 10A:
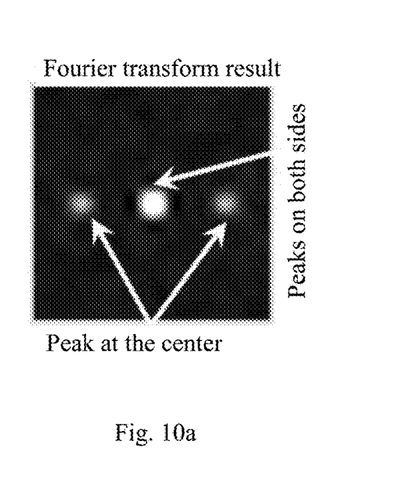
FIG. 10a is a schematic diagram of a Fourier transform result of an image obtained by the light blocking element provided by another embodiment of the present invention.

As an example, the relative movement amount S of the two images on each imaging element 3 in FIG. 5, FIG. 5*a*, and FIG. 5*b* can be calculated by an image processing method, and as shown in the example in FIG. 6, FIG. 6*a*, FIG. 6*b* and FIG. 6*c*, the image processing method specifically includes:

step S421, as shown in FIG. 6, collecting an image presented by the first reference object 5 on the imaging element 3, and setting the same as a first image, wherein the relative displacement of the two images in the first image is S;

step S422, performing first time two-dimensional Fourier transform on the first image, and taking an absolute value of a Fourier transform result to obtain a second image, as shown in FIG. 6*a*;

step S423, performing second time two-dimensional Fourier transform on the second image, and taking the absolute value of the Fourier transform result to obtain a third image, as shown in FIG. 6*b*;

step S424, taking the values of a column of pixels at the middle of the third image along the connecting line direction of the two light transmitting holes 111, wherein in the present embodiment, the values of a column of pixels are taken along the middle of the FIG. 6*b* along the vertical direction; and it should be noted that, the arrangement of the two light transmitting holes 111 can be in any direction, on the imaging element 3, the mutual stagger directions of the two images of the actual object or the virtual image of the measured near-eye display 4 are consistent with the arrangement direction of the two light transmitting holes 111. Furthermore, in the process of image processing, after twice Fourier transform and after the absolute values are taken, the arrangement direction of the peaks is also consistent with the arrangement direction of the two light transmitting holes 111. In the example as shown in FIG. 10 and FIG. 10*a*, if two light transmitting holes 111 arranged in the horizontal direction are adopted, then in the result after the twice Fourier transform and after the absolute values are taken, the peaks are also in the horizontal direction. Therefore, for two minipores arranged in any direction, in the result after the twice Fourier transform and after the absolute values are taken, the intensity of the pixels should be obtained in the direction where the corresponding peaks are located, and the positions of the middle peak and the peaks on the both sides are obtained.

Figure 6C:
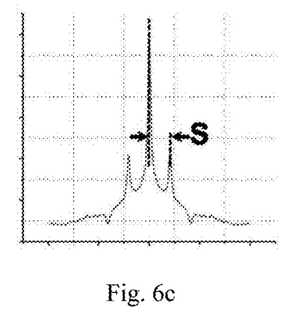
FIG. 6c is a schematic diagram of obtaining a first curve provided by an embodiment of the present invention.

Step S425, drawing a first curve by using the values of the column of pixels as vertical coordinates and the values of the corresponding pixel positions as abscissas, as shown in FIG. 6*c*; and step S426, obtaining a middle peak position m of the first curve and a peak position n on the left side or right side of the middle peak, and obtaining the absolute value of m-n, that is, the relative movement amount S of the two images presented by the first reference object 5 on the imaging element 3. As an example, the positions of the peaks need not be equal to an integer number of pixels values, for example, the position of the middle peak can be at the position of the 100.2th pixel, the position of the right peak can be at the position of the 150.3th pixel, and the distance between the two peaks is 50.1 pixels. In this way, a more accurate distance between the two peaks can be obtained, that is, a more accurate relative movement amount between the two images can be obtained.

Figure 7:
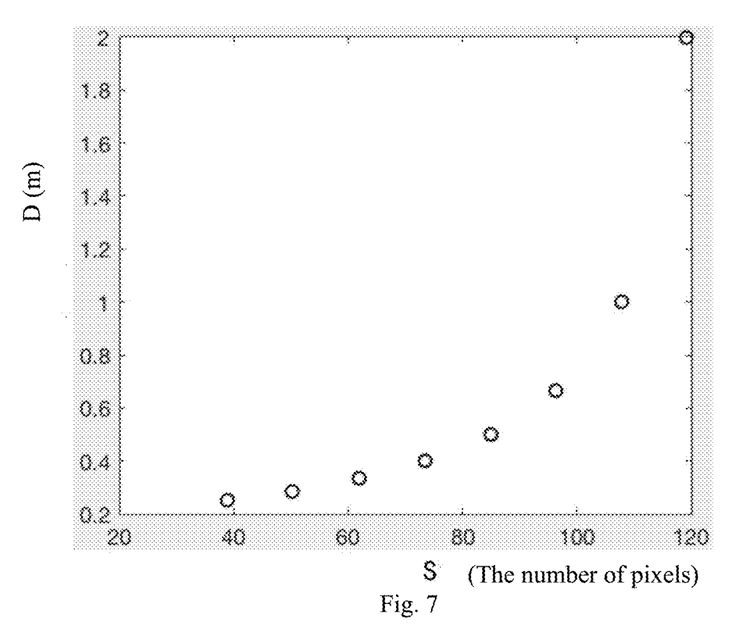
FIG. 7 is a relationship diagram of the distance and the relative movement amount between the first reference object and the lens element provided by an embodiment of the present invention.
Figure 8:
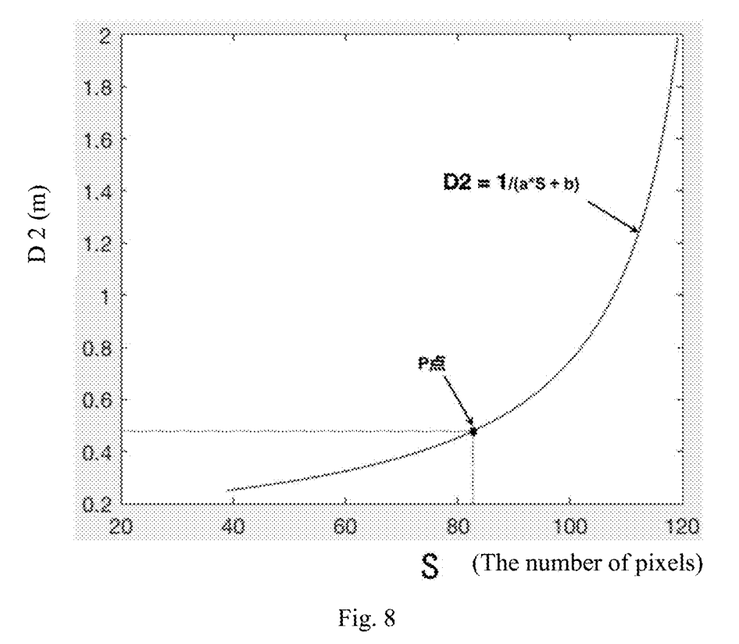
FIG. 8 is a relationship diagram of the distance and the relative movement amount between a virtual image and the lens element provided by an embodiment of the present invention.

Within a certain range, the distance between the first reference object 5 and the lens element 2 is changed with a certain change step length. At each distance D, the two images of the first reference object 5 are collected by using the imaging element 3, and the relative movement amount S between the two images is obtained by the image processing method described in the step S421 to the step S426. The obtained relative movement amount is used as the abscissa, and the corresponding distance between the first reference object 5 and the lens element 2 is used as the vertical coordinate, then the curve as shown in FIG. 7 can be obtained. In FIG. 7, each circle represents a pair of measured values. The formula $D=1/(a*+b)$ describing the relationship between D and S should be found in the next step. In order to facilitate the calculation, a relational expression $1/D=a*S+b$ between $1/D$ and S can be found, this is a linear relational expression, and the values of a and b in the formula can be obtained by a unary linear regression method. In this way, the relational expression between D and S can be obtained, and the curve of the relational expression is shown in FIG. 8. As an example, a variation range of the distance between the first reference object 5 and the lens element 2 can be set in advance, and this range can be determined by the distance distribution interval of the virtual image of the measured near-eye display. For example, it can be known through optical design and theoretical calculation that the distance between the virtual image of the measured near-eye display and the lens element 2 is within the range of 0.2 m to 2 m, and then the first reference object 5 can be moved within a range of 0.2 m to 2 m away from the lens element.

In a test phase, the virtual image of the measured near-eye display 4 is used as the object of a photographing system, and a picture is collected, wherein there are two images of the virtual image of the near-eye display, and by calculating the relative movement amount S between the two images, the distance D2 between the virtual image of the near-eye display and the camera lens can be calculated according to the formula $D2=1/(a*S+b)$. In a second method, for example, the relative movement amount between the two images is figured out as 82 pixels by using FIG. 8, a line vertical to the abscissa is made through the point, the line intersects the relational expression curve at a point P, the value of the vertical coordinate corresponding to the point P is 0.45 m, and this value is the distance between the virtual image of the near-eye display and the camera lens.

Figure 9:
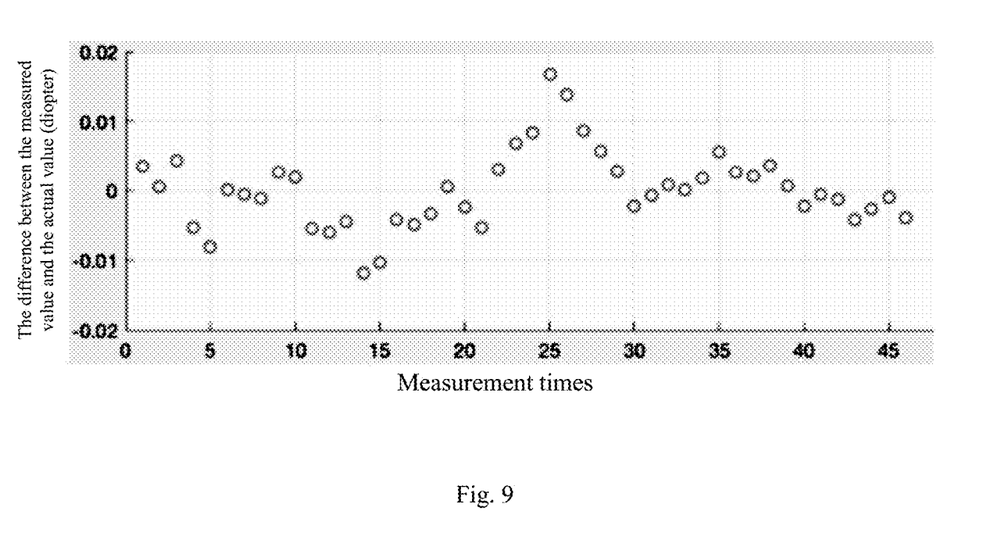
FIG. 9 is a schematic diagram of the difference between a measured value and an actual value of a measured virtual image provided by an embodiment of the present invention.

As an example, at 46 known positions of the virtual image distance, the relative movement amount between the two images of the virtual image is calculated, and then the measured virtual image distance is obtained. The difference between the actual value and the measured value of the virtual image distance is used as a measurement error. FIG. 9 shows the errors of 46 measurements. A diopter is used as the unit of the measurement error, and 1 diopter is equal to 1/1 meter. If the virtual image distance of a certain measurement is M m, and the actual distance is N m, then the measurement error of this time is $(1/M-1/N)$ diopter. It can be seen from FIG. 9 that, the errors of 46 measurements are all within +/−0.02 diopters. Human eyes can only distinguish the change of the virtual image distance exceeding 0.25 diopters in the direction along the optical axis W, therefore, it can be known that the virtual image distance measurement method in the embodiment of the present invention has very high accuracy.

Embodiment 2

Figure 11:
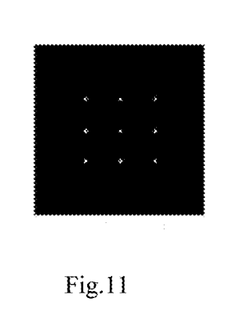
FIG. 11 is a schematic diagram of a second reference object provided by another embodiment of the present invention.
Figure 11A:
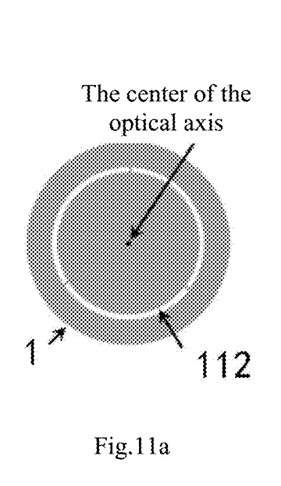
FIG. 11a is a schematic diagram of a light blocking element provided by yet another embodiment of the present invention.
Figure 11B:
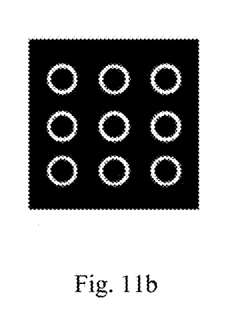
FIG. 11b is a schematic diagram of an image of the second reference object on the imaging element provided by yet another embodiment of the present invention.

As shown in FIG. 11, FIG. 11a and FIG. 11b, the light transmitting portion 11 is a light passing circular ring 112, the center of the light passing circular ring 112 coincides with the center of the optical axis W of the lens element 2, the virtual image of the measured near-eye display 4 presents a plurality of circular rings on the imaging element 3 after passing through the light blocking element 1 and the lens element 2, the distance measurement parameter is the diameter of the circular ring and is set as DC, the virtual image distance is set as D2, and the preset distance calculation formula is $D2=1/(c*DC+d)$, wherein c and d are coefficients.

The outer diameter of the light passing circular ring 112 is less than the entrance pupil diameter of the lens element 2, and the difference between the outer diameter and the inner diameter of the light passing circular ring 112 is in direct proportion to the difference between the inner diameter and the outer diameter of the circular ring on the imaging element 3. The smaller the difference between the outer diameter and the inner diameter of the light passing circular ring 112 is, the thinner the circular ring on the imaging element 3 is, and the larger the difference between the outer diameter and the inner diameter of the light passing circular ring 112 is, the thicker the circular ring on the imaging element 3 is. The size of the bright spot also affects the thickness of the circular ring on the imaging element 3, the larger the bright spot is, the thicker the circular ring on the imaging element 3 is, and the smaller the bright spot is, the thinner the circular ring on the imaging element 3 is. Therefore, the difference between the inner diameter and the outer diameter of the light passing circular ring 112 and the size of the bright spot can be considered comprehensively, so that the thickness of the circular ring on the imaging element 3 is the sizes of several pixels of the imaging element 3. In addition, the distance between the bright spots should ensure that there is at least one bright spot within the imaging range of the lens element 2, and several bright spots need not be evenly arranged in the horizontal and vertical directions.

The method further includes a step S5 of determining the values of c and d, and the process is implemented in the correction link and specifically includes:

step S51, disposing a second reference object, wherein the second reference object includes a plurality of separated bright spots for simulating the virtual image of the measured near-eye display 4, setting the distance between the second reference object and the lens element 2 as D0, and obtaining a D0 value by the measurement of the distance measurement apparatus 6;

step S52, moving the second reference object along the optical axis W of the lens element 2 to obtain multiple D0 values, causing the second reference object to correspond to a plurality of circular rings in one group on the imaging element 3 corresponding to each D0 value, and obtaining the diameters DC of the circular rings through Hough transform to obtain multiple groups of D0 values and DC values; and step S53, determining the values of c and d based on the multiple groups of D0 values and DC values.

As an example, the second reference object with the plurality of separated bright spots can be moved within a certain range at a certain step length along the optical axis W of the lens element 2. The distance between the actual object and the camera lens is measured by using the distance measurement apparatus, and the diameter of the circular ring on the imaging element 3 at the corresponding distance is calculated by using the Hough Transform. Similar to the method of figuring out a and b, the values of c and d in the relational expression $D2=1/(c*DC+d)$ are obtained by using unary linear regression, which will not be repeated herein.

In a measurement phase, the second reference object with the plurality of separated bright spots is used as the virtual image of the measured near-eye display, and this virtual image passes through the camera lens passing through the light blocking plate with the light passing circular ring 112 to generate a plurality of circular rings on the imaging element 3. The diameter of the circular ring is obtained by using the Hough transform, and the distance between the virtual image and the lens element 2 can be obtained by using the formula $D2=1/(c*DC+d)$.

The embodiment of the present invention further provides a virtual image distance measurement apparatus, including a calculation module 7, and a light blocking element 1, a lens element 2 and an imaging element 3, which are sequentially disposed along the optical axis of the lens element 2, wherein a light transmitting portion 11 is formed on the light blocking element 1, and the virtual image position B of a measured near-eye display 4 does not coincide with the imaging position A of the lens element 2; a virtual image of the measured near-eye display 4 presents multiple images on the imaging element 3 after passing through the light blocking element 1 and the lens element 2; and the calculation module 7 is configured to determine a distance measurement parameter based on the multiple images, and substitute the distance measurement parameter into a preset distance calculation formula to obtain a virtual image distance.

By disposing the light transmitting portion 11 on the light blocking element 1, the movement amount of the virtual image along the direction of the optical axis W is converted into the movement amount or deformation of a measurable image on the imaging element 3: for example, a light blocking element 1 with a plurality of light passing minipores is placed on an entrance pupil or exit pupil plane of the lens element 2, and then, the variation of the virtual image along the optical axis W is converted into the relative movement amount between the images on the imaging element 3. Or, the light blocking element 1 is a light blocking plate with a light passing circular ring 112, and is placed on the entrance pupil plane of the lens element 2 so as to convert the variation of the virtual image along the optical axis W into the deformation amount of the image on the imaging element 3. Different light transmitting portions 11 are disposed to correspond to different preset distance calculation formulas, which are described below through two embodiments:

Embodiment 3

The light transmitting portion 11 includes M light transmitting holes 111, the virtual image of the measured near-eye display 4 presents M images on the imaging element 3 after passing through the light blocking element 1 and the lens element 2, wherein M is a positive integer greater than or equal to 2; and the distance measurement parameter is the relative movement amount of the M images, and is set as S, the virtual image distance is set as D2, and the preset distance calculation formula is $D2=1/(a*S+b)$, wherein a and b are coefficients.

The calculation module 7 is further configured to determine the values of a and b, and the process is implemented in a correction link and specifically includes:

disposing a first reference object 5, wherein the first reference object 5 is configured to simulate the virtual image of the measured near-eye display 4, and the distance between the first reference object 5 and the lens element 2 is set as D;

moving the first reference object 5 along the optical axis W of the lens element 2, obtaining a D value by the measurement of a distance measurement apparatus 6, obtaining multiple D values, causing the first reference object 5 to correspond to a group of M images on the imaging element 3 corresponding to each D value, and calculating the relative movement amount S of each group of M images to obtain multiple groups of D values and S values; and determining the a value and the b value based on the multiple groups of D values and S values.

As an example, the light transmitting portion 11 includes two light transmitting holes 111, the first reference object 5 presents two images on the imaging element 3, in the example as shown in FIG. 2, the two light transmitting holes 111 are arranged along the vertical direction, as shown in FIG. 3, but it can be understood that, the light blocking element 1 shown in FIG. 2 and FIG. 3 is only an example, the number of the light transmitting holes 111 is not limited to two, and may be two or more, the arrangement manner is not limited to the arrangement along the vertical direction, and may be any direction. The calculation module 7 is further configured to calculate the relative movement amount S of the two images on the imaging element 3, which specifically includes:

a first image obtaining unit, configured to collect an image presented by the first reference object 5 on the imaging element 3, and set the same as a first image;

a second image obtaining unit, configured to perform first time two-dimensional Fourier transform on the first image, and take an absolute value of a Fourier transform result to obtain a second image;

a third image obtaining unit, configured to perform second time two-dimensional Fourier transform on the second image, and take the absolute value of the Fourier transform result to obtain a third image;

a pixel value obtaining unit, configured to take the values of a column of pixels at the middle of the third image along the connecting line direction of the two light transmitting holes 111;

a first curve drawing unit, configured to draw a first curve by using the values of the column of pixels as vertical coordinates and the values of the corresponding pixel positions as abscissas; and a relative movement amount obtaining unit, configured to obtain a middle peak position m of the first curve and a peak position n on the left side or right side of the middle peak, and obtain the absolute value of m-n, that is, the relative movement amount S of the two images presented by the first reference object 5 on the imaging element 3.

It is set that the center distance between the two light transmitting holes 111 is SP, the diameter of each light transmitting hole 111 is DP, the entrance pupil diameter of the lens element 2 is d, and SP+DP is less than d.

Within a certain range, the distance between the first reference object 5 and the lens element 2 is changed with a certain change step length. At each distance D, the two images of the first reference object 5 are collected by using the imaging element 3, and the relative movement amount S between the two images is obtained by the image processing method described by the calculation module 7. The obtained relative movement amount is used as the abscissa, and the corresponding distance between the first reference object 5 and the lens element 2 is used as the vertical coordinate, then the curve as shown in FIG. 7 can be obtained. In FIG. 7, each circle represents a pair of measured values. The formula $D=1/(a*+b)$ describing the relationship between D and S should be found in the next step. In order to facilitate the calculation, a relational expression $1/D=a*S+b$ between $1/D$ and S can be found, this is a linear relational expression, and the values of a and b in the formula can be obtained by a unary linear regression method. In this way, the relational expression between D and S can be obtained, and the curve of the relational expression is shown in FIG. 8. As an example, a variation range of the distance between the first reference object 5 and the lens element 2 can be set in advance, and this range can be determined by the distance distribution interval of the virtual image of the measured near-eye display. For example, it can be known through optical design and theoretical calculation that the distance between the virtual image of the measured near-eye display and the lens element 2 is within the range of 0.2 m to 2 m, and then the first reference object 5 can be moved within a range of 0.2 m to 2 m away from the lens element.

In a test phase, the virtual image of the measured near-eye display 4 is used as the object of a photographing system, and a picture is collected, wherein there are two images of the virtual image of the near-eye display, and the calculation module 7 can calculate the distance D2 between the virtual image of the near-eye display and the camera lens by calculating the relative movement amount S between the two image and according to the formula D2=1/(a*S+b). In a second method, for example, the relative movement amount between the two images is figured out as 82 pixels by using FIG. 8, a line vertical to the abscissa is made through the point, the line intersects the relational expression curve at a point P, the value of the vertical coordinate corresponding to the point P is 0.45 m, and this value is the distance between the virtual image of the near-eye display and the camera lens.

Embodiment 4

The light transmitting portion 11 is a light passing circular ring 112, the center of the light passing circular ring 112 coincides with the center of the optical axis W of the lens element 2, the virtual image of the measured near-eye display 4 presents a plurality of circular rings on the imaging element 3 after passing through the light blocking element 1 and the lens element 2, the distance measurement parameter is the diameter of the circular ring and is set as DC, the virtual image distance is set as D2, and the preset distance calculation formula is D2=1/(c*DC+d), wherein c and d are coefficients.

The outer diameter of the light passing circular ring 112 is less than the entrance pupil diameter of the lens element 2, and the difference between the outer diameter and the inner diameter of the light passing circular ring 112 is in direct proportion to the difference between the inner diameter and the outer diameter of the circular ring on the imaging element 3. The smaller the difference between the outer diameter and the inner diameter of the light passing circular ring 112 is, the thinner the circular ring on the imaging element 3 is, and the larger the difference between the outer diameter and the inner diameter of the light passing circular ring 112 is, the thicker the circular ring on the imaging element 3 is. The size of the bright spot also affects the thickness of the circular ring on the imaging element 3, the larger the bright spot is, the thicker the circular ring on the imaging element 3 is, and the smaller the bright spot is, the thinner the circular ring on the imaging element 3 is. Therefore, the difference between the inner diameter and the outer diameter of the light passing circular ring 112 and the size of the bright spot can be considered comprehensively, so that the thickness of the circular ring on the imaging element 3 is the sizes of several pixels of the imaging element 3. In addition, the distance between the bright spots should ensure that there is at least one bright spot within the imaging range of the lens element 2, and several bright spots need not be evenly arranged in the horizontal and vertical directions.

The calculation module 7 is further configured to determine the values of c and d, which specifically includes:

disposing a second reference object, wherein the second reference object includes a plurality of separated bright spots for simulating the virtual image of the measured near-eye display 4, setting the distance between the second reference object and the lens element 2 as D0, and obtaining a D0 value by the measurement of the distance measurement apparatus 6;

moving the second reference object along the optical axis W of the lens element 2, obtaining multiple D0 values, causing the second reference object to correspond to a plurality of circular rings in one group on the imaging element 3 corresponding to each D0 value, and obtaining the diameters DC of the circular rings through Hough transform to obtain multiple groups of D0 values and DC values; and determining the values of c and d based on the multiple groups of D0 values and DC values.

As an example, the second reference object with the plurality of separated bright spots can be moved within a certain range at a certain step length along the optical axis W of the lens element 2. The distance between the actual object and the camera lens is measured by using the distance measurement apparatus, and the diameter of the circular ring on the imaging element 3 at the corresponding distance is calculated by using the Hough Transform. Similar to the method of figuring out a and b, the values of c and d in the relational expression D2=1/(c*DC+d) are obtained by using unary linear regression, which will not be repeated herein.

In a measurement phase, the second reference object with the plurality of separated bright spots is used as the virtual image of the measured near-eye display, and this virtual image passes through the camera lens passing through the light blocking plate with the light passing circular ring 112 to generate a plurality of circular rings on the imaging element 3. The diameter of the circular ring is obtained by using the Hough transform, and the distance between the virtual image and the lens element 2 can be obtained by using the formula D2=1/(c*DC+d).

According to a third embodiment of the present invention, a virtual image distance measurement device is provided, as shown in FIG. 2 and FIG. 4, including a light blocking element 1, a lens element 2 and an imaging element 3, which are sequentially disposed along the optical axis W of the lens element 2, wherein a light transmitting portion 11 is formed on the light blocking element 1, so that a virtual image of a measured near-eye display 4 presents multiple images on the imaging element 3 after passing through the light blocking element 1 and the lens element 2, and the virtual image position B of the measured near-eye display does not coincide with the imaging position A of the lens element 2.

The light transmitting portion 11 includes M light transmitting holes 111, the virtual image of the measured near-eye display 4 presents M images on the imaging element 3 after passing through the light blocking element 1 and the lens element 2, wherein M is a positive integer greater than or equal to 2. Or, the light transmitting portion 11 is a light passing circular ring 112, the center of the light passing circular ring 112 coincides with the center of the optical axis W of the lens element 2, and the virtual image of the measured near-eye display 4 presents a plurality of circular rings on the imaging element 3 after passing through the light blocking element 1 and the lens element 2.

The embodiment of the present invention further provides a controller, including a memory and a processor, wherein the memory stores a computer program, and the program can implement computer-executable steps in the virtual image distance measurement method when executed by the processor.

The embodiment of the present invention further provides a computer-readable storage medium for storing a computer program, wherein the program can implement computer-executable steps in the virtual image distance measurement method when executed by a computer or a processor.

The embodiments of the present invention have low requirements for the accuracy of the mechanical scanning devices, no mechanical scanning is required during the measurement process, and only a picture needs to be collected to obtain the virtual image distance, so that the measurement time is short, and the measurement accuracy is high.

The above descriptions are only the preferred embodiments of the present invention, and do not limit the present invention in any form. Although the present invention has been disclosed as above with the preferred embodiments, the present invention is not limited thereto. Any skilled who is familiar with this art can make some changes by using the technical contents disclosed above or modify the technical contents as equivalent embodiments to equivalent changes, without departing from the scope of the technical solutions of the present invention. Any simple modifications, equivalent changes and modifications, made according to the technical essence of the present invention without departing from the contents of the technical solutions of the present invention, still belong to the scope of the technical solutions of the present invention.

What is claimed:

1. A virtual image distance measurement method, comprising:
    disposing a light blocking element, a lens element and an imaging element along the optical axis of the lens element in sequence, wherein a light transmitting portion is formed on the light blocking element, and the virtual image position of a measured near-eye display does not coincide with the imaging position of the lens element;
    presenting, by a virtual image of the measured near-eye display, multiple images on the imaging element after passing through the light blocking element and the lens element; and
    determining a distance measurement parameter based on the multiple images, and substituting the distance measurement parameter into a preset distance calculation formula to obtain a virtual image distance,
        wherein the light transmitting portion comprises M light transmitting holes, and the virtual image of the measured near-eye display presents M images on the imaging element after passing through the light blocking element and the lens element, wherein M is a positive integer greater than or equal to 2, and
        wherein the distance measurement parameter is the relative movement amount of the M images, and is set as S, the virtual image distance is set as D2, and the preset distance calculation formula is $D2=1/(a*S+b)$, wherein a and b are coefficients.

2. The virtual image distance measurement method according to claim 1, wherein,
    the method further comprises: determining the values of a and b, which specifically comprises:
    disposing a first reference object, wherein the first reference object is configured to simulate the virtual image of the measured near-eye display, and the distance between the first reference object and the lens element is set as D;
    moving the first reference object along the optical axis of the lens element, obtaining a D value by the measurement of a distance measurement apparatus, obtaining multiple D values, causing the first reference object to correspond to a group of M images on the imaging element corresponding to each D value, and calculating the relative movement amount S of each group of M images to obtain multiple groups of D values and S values; and
    determining the a value and the b value based on the multiple groups of D values and S values.

3. The virtual image distance measurement method according to claim 2, wherein,
the light transmitting portion comprises two light transmitting holes, the first reference object presents two images on the imaging element, and the calculating the relative movement amount S of the two images on the imaging element comprises:
    collecting an image presented by the first reference object on the imaging element, and setting the same as a first image;
    performing first time two-dimensional Fourier transform on the first image, and taking an absolute value of a Fourier transform result to obtain a second image;
    performing second time two-dimensional Fourier transform on the second image, and taking the absolute value of the Fourier transform result to obtain a third image;
    taking the values of a column of pixels at the middle of the third image along the connecting line direction of the two light transmitting holes;
    drawing a first curve by using the values of the column of pixels as vertical coordinates and the values of the corresponding pixel positions as abscissas; and
    obtaining a middle peak position m of the first curve and a peak position n on the left side or right side of the middle peak, and obtaining the absolute value of m-n, that is, the relative movement amount S of the two images presented by the first reference object on the imaging element.

4. The virtual image distance measurement method according to claim 3, wherein, it is set that the center distance between the two light transmitting holes is SP, the diameter of each light transmitting hole is DP, the entrance pupil diameter of the lens element is d, and SP+DP is less than d.

5. The virtual image distance measurement method according to claim 1, wherein, the light transmitting portion is a light passing circular ring, the center of the light passing circular ring coincides with the center of the optical axis of the lens element, the virtual image of the measured near-eye display presents a plurality of circular rings on the imaging element after passing through the light blocking element and the lens element, the distance measurement parameter is the diameter of the circular ring and is set as DC, the virtual image distance is set as D2, and the preset distance calculation formula is $D2=1/(c*DC+d)$, wherein c and d are coefficients.

6. The virtual image distance measurement method according to claim 5, wherein, the method further comprises: determining the values of c and d, which specifically comprises:

disposing a second reference object, wherein the second reference object comprises a plurality of separated bright spots for simulating the virtual image of the measured near-eye display, setting the distance between the second reference object and the lens element as D0, and obtaining a D0 value by the measurement of the distance measurement apparatus;

moving the second reference object along the optical axis of the lens element, obtaining multiple D0 values, causing the second reference object to correspond to a plurality of circular rings in one group on the imaging element corresponding to each D0 value, and obtaining the diameters DC of the circular rings through Hough transform to obtain multiple groups of D0 values and DC values; and determining the values of c and d based on the multiple groups of D0 values and DC values.

7. The virtual image distance measurement method according to claim 5, wherein,
the outer diameter of the light passing circular ring is less than the entrance pupil diameter of the lens element.

8. A virtual image distance measurement apparatus, comprising:
a calculation module, and a light blocking element, a lens element and an imaging element, which are sequentially disposed along the optical axis of the lens element, wherein a light transmitting portion is formed on the light blocking element, and the virtual image position of a measured near-eye display does not coincide with the imaging position of the lens element; a virtual image of the measured near-eye display presents multiple images on the imaging element after passing through the light blocking element and the lens element; and the calculation module is configured to determine a distance measurement parameter based on the multiple images, and substitute the distance measurement parameter into a preset distance calculation formula to obtain a virtual image distance,
wherein the light transmitting portion comprises M light transmitting holes, and the virtual image of the measured near-eye display presents M images on the imaging element after passing through the light blocking element and the lens element, wherein M is a positive integer greater than or equal to 2, and
wherein the distance measurement parameter is the relative movement amount of the M images, and is set as S, the virtual image distance is set as D2, and the preset distance calculation formula is $D2=1/(a*S+b)$, wherein a and b are coefficients.

9. The virtual image distance measurement apparatus according to claim 8, wherein, the calculation module is further configured to determine the values of a and b, which specifically comprises:
disposing a first reference object, wherein the first reference object is configured to simulate the virtual image of the measured near-eye display, and the distance between the first reference object and the lens element is set as D;

moving the first reference object along the optical axis of the lens element, obtaining a D value by the measurement of a distance measurement apparatus, obtaining multiple D values, causing the first reference object to correspond to a group of M images on the imaging element corresponding to each D value, and calculating the relative movement amount S of each group of M images to obtain multiple groups of D values and S values; and determining the a value and the b value based on the multiple groups of D values and S values.

10. The virtual image distance measurement apparatus according to claim 9, wherein,
the light transmitting portion comprises two light transmitting holes, the first reference object presents two images on the imaging element, and the calculation module is further configured to calculate the relative movement amount S of the two images on the imaging element, which specifically comprises:
a first image obtaining unit, configured to collect an image presented by the first reference object on the imaging element, and set the same as a first image;
a second image obtaining unit, configured to perform first time two-dimensional Fourier transform on the first image, and take an absolute value of a Fourier transform result to obtain a second image;
a third image obtaining unit, configured to perform second time two-dimensional Fourier transform on the second image, and take the absolute value of the Fourier transform result to obtain a third image;
a pixel value obtaining unit, configured to take the values of a column of pixels at the middle of the third image along the connecting line direction of the two light transmitting holes;
a first curve drawing unit, configured to draw a first curve by using the values of the column of pixels as vertical coordinates and the values of the corresponding pixel positions as abscissas; and
a relative movement amount obtaining unit, configured to obtain a middle peak position m of the first curve and a peak position n on the left side or right side of the middle peak, and obtain the absolute value of m-n, that is, the relative movement amount S of the two images presented by the first reference object on the imaging element.

11. The virtual image distance measurement apparatus according to claim 10, wherein,
it is set that the center distance between the two light transmitting holes is SP, the diameter of each light transmitting hole is DP, the entrance pupil diameter of the lens element is d, and SP+DP is less than d.

12. The virtual image distance measurement apparatus according to claim 8, wherein,
the light transmitting portion is a light passing circular ring, the center of the light passing circular ring coincides with the center of the optical axis of the lens element, the virtual image of the measured near-eye display presents a plurality of circular rings on the imaging element after passing through the light blocking element and the lens element, the distance measurement parameter is the diameter of the circular ring and is set as DC, the virtual image distance is set as D2, and the preset distance calculation formula is $D2=1/(c*DC+d)$, wherein c and d are coefficients.

13. The virtual image distance measurement apparatus according to claim 12, wherein,
the calculation module is further configured to determine the values of c and d, which specifically comprises:
disposing a second reference object, wherein the second reference object comprises a plurality of separated bright spots for simulating the virtual image of the measured near-eye display, setting the distance between the second reference object and the lens element as D0, and obtaining a D0 value by the measurement of the distance measurement apparatus;

moving the second reference object along the optical axis of the lens element, obtaining multiple D0 values, causing the second reference object to correspond to a plurality of circular rings in one group on the imaging element corresponding to each D0 value, and obtaining the diameters DC of the circular rings through Hough transform to obtain multiple groups of D0 values and DC values; and determining the values of c and d based on the multiple groups of D0 values and DC values.

14. The virtual image distance measurement apparatus according to claim 12, wherein, the outer diameter of the light passing circular ring is less than the entrance pupil diameter of the lens element.

15. A virtual image distance measurement device, comprising:

a light blocking element, a lens element and an imaging element, which are sequentially disposed along the optical axis of the lens element, wherein a light transmitting portion is formed on the light blocking element, so that a virtual image of a measured near-eye display presents multiple images on the imaging element after passing through the light blocking element and the lens element, and the virtual image position of the measured near-eye display does not coincide with the imaging position of the lens element, wherein the light transmitting portion comprises M light transmitting holes, and the virtual image of the measured near-eye display presents M images on the imaging element after passing through the light blocking element and the lens element, wherein M is a positive integer greater than or equal to 2, and wherein the distance measurement parameter is the relative movement amount of the M images, and is set as S, the virtual image distance is set as D2, and the preset distance calculation formula is $D2=1/(a*S+b)$, wherein a and b are coefficients.

16. The virtual image distance measurement device according to claim 15, wherein, the light transmitting portion is a light passing circular ring, the center of the light passing circular ring coincides with the center of the optical axis of the lens element, and the virtual image of the measured near-eye display presents a plurality of circular rings on the imaging element after passing through the light blocking element and the lens element.

* * * * *